US006745212B2

(12) United States Patent
Kishi et al.

(10) Patent No.: US 6,745,212 B2
(45) Date of Patent: Jun. 1, 2004

(54) PREFERENTIAL CACHING OF UNCOPIED LOGICAL VOLUMES IN AN IBM PEER-TO-PEER VIRTUAL TAPE SERVER

(75) Inventors: Gregory Tad Kishi, Oro Valley, AZ (US); Mark Allan Norman, Tucson, AZ (US); Jonathan Wayne Peake, Tucson, AZ (US); William Henry Travis, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 253 days.

(21) Appl. No.: 09/892,931

(22) Filed: Jun. 27, 2001

(65) Prior Publication Data

US 2003/0004980 A1 Jan. 2, 2003

(51) Int. Cl.[7] .............................................. G06F 12/00
(52) U.S. Cl. ...................... 707/204; 707/203; 711/113; 711/134; 711/160
(58) Field of Search .................................. 707/204, 203, 707/201, 200; 711/112, 113, 161, 160, 162, 135, 136, 134

(56) References Cited

U.S. PATENT DOCUMENTS

| | | | |
|---|---|---|---|
| 4,638,424 A | | 1/1987 | Beglin et al. |
| 4,707,784 A | | 11/1987 | Ryan et al. |
| 4,771,375 A | | 9/1988 | Beglin et al. |
| 4,811,203 A | * | 3/1989 | Hamstra ..................... 711/142 |
| 5,327,535 A | | 7/1994 | Ogata et al. |
| 5,353,430 A | * | 10/1994 | Lautzenheiser ............. 711/117 |
| 5,390,318 A | * | 2/1995 | Ramakrishnan et al. .... 711/158 |
| 5,412,801 A | * | 5/1995 | de Remer et al. ............ 714/20 |
| 5,604,862 A | * | 2/1997 | Midgely et al. ............... 714/6 |
| 5,608,865 A | * | 3/1997 | Midgely et al. ............... 714/1 |
| 5,682,513 A | * | 10/1997 | Candelaria et al. ......... 711/113 |
| 5,758,355 A | * | 5/1998 | Buchanan ................... 707/201 |

(List continued on next page.)

FOREIGN PATENT DOCUMENTS

| | | |
|---|---|---|
| JP | 7248971 | 9/1995 |
| WO | 0004454 | 1/2000 |

OTHER PUBLICATIONS

Bertossi, A.A., L.V. Mancini, and F. Rossini, "Fault–tolerant rate–monotonic first–fit scheduling in hard–real–time systems", *IEEE Transactions on Parallel and Distributed Systems*, vol. 10, No. 9, Sep. 1999, pp. 934–945. (abstract).

Chiaverini, S. "Task–priority Redundancy Resolution with Robustness to Algorithmic Singularities", *4th IFAC Symposium on Robot Control*, Capri, I, Sep. 1994, pp. 393–399. (abstract).

He Jun, Tian Fan Jiang, Wang Ding Xing, "Cooperative Caching for Network Filesystem on Workstation Cluster", *Chinese Journal of Computers*, vol. 20, No. 10, Oct. 1997, pp. 899–907. (abstract).

(List continued on next page.)

*Primary Examiner*—Safet Metjahic
*Assistant Examiner*—Brian Goddard
(74) *Attorney, Agent, or Firm*—David W. Victor; Konrad Raynes & Victor LLP

(57) ABSTRACT

Disclosed is a system, method, and an article of manufacture for preferentially keeping an uncopied data set in one of two storage devices in a peer-to-peer environment when data needs to be removed from the storage devices. Each time a data set is modified or newly created, flags are used to denote whether the data set needs to be copied from one storage device to the other. The preferred embodiments modify the timestamp for each uncopied data set by adding a period of time, and thus give preference to the uncopied data set when the data from the storage device is removed based on the least recently used as denoted by timestamp of each data set. Once the data set is copied, the timestamp is set back to normal by subtracting the same period of time added on when the data set was flagged as needing to be copied.

31 Claims, 5 Drawing Sheets

U.S. PATENT DOCUMENTS

| | | | | |
|---|---|---|---|---|
| 5,778,389 A | * | 7/1998 | Pruett et al. | 707/204 |
| 5,799,323 A | * | 8/1998 | Mosher et al. | 707/202 |
| 5,829,024 A | | 10/1998 | Sato | |
| 5,884,328 A | * | 3/1999 | Mosher, Jr. | 707/202 |
| 5,926,834 A | | 7/1999 | Carlson et al. | |
| 5,936,971 A | * | 8/1999 | Harari et al. | 714/710 |
| 5,978,791 A | * | 11/1999 | Farber et al. | 707/2 |
| 6,167,531 A | * | 12/2000 | Sliwinski | 714/13 |
| 6,295,541 B1 | * | 9/2001 | Bodnar et al. | 707/203 |
| 6,463,513 B1 | | 10/2002 | Bish et al. | |
| 6,523,132 B1 | * | 2/2003 | Harari et al. | 714/8 |
| 2002/0065919 A1 | * | 5/2002 | Taylor et al. | 709/226 |

OTHER PUBLICATIONS

He Jun, Tian Fan Jiang, Wang Ding Xing, "Efficient Cooperative Caching for Network Filesystem on Workstation Cluster", *Chinese Journal of Advanced Software Research*, vol. 5, No. 2, 1998, pp. 101–110. (abstract).

IBM Corporation, "Critical Page Caching in an External Memory Manager", *IBM Technical Disclosure Bulletin*, vol. 38, No. 11, Nov. 1995, pp. 187–190.

IBM Corporation, "High Capacity DASD Dual–Copy Secondary to Multiple 3390 Primary Devices", *IBM Technical Disclosure Bulletin*, vol. 37, No. 06A, Jun. 1994, pp. 493–497.

Meiseles, Y. "Virtual Disks'—A System for Managing a Pool of Users' Data Sets", *Management Datamatics*, vol. 5, No. 4, Aug. 1996, pp. 165–169. (abstract).

Sudo, Y. "A Cooperative Caching Algorithm for Cluster Distributed File Servers", *Transaction of the Information Processing Society of Japan*, vol. 40, No. 6, Jun. 1999, pp. 2607–2617. (abstract).

* cited by examiner

PREFERENTIAL CACHING OF UNCOPIED LOGICAL VOLUMES IN AN IBM PEER-TO-PEER VIRTUAL TAPE SERVER

BACKGROUND OF THE INVENTION

1. Field of the Invention

The present invention relates to a system, method, and program for copying data from one virtual tape server to another virtual tape server in a peer-to-peer environment.

2. Description of the Related Art

In prior art virtual tape storage systems, hard disk drive storage is used to emulate tape drives and tape cartridges. In this way, host systems performing input/output (I/O) operations with respect to tape are in fact performing I/O operations with respect to a set of hard disk drives emulating the tape storage. In the prior art International Business Machines (IBM) Magstar Virtual Tape Server, one or more virtual tape servers ("VTS") are each integrated with a tape library comprising numerous tape cartridges and tape drives, and have a direct access storage device (DASD) comprised of numerous interconnected hard disk drives. The operation of the virtual tape server is transparent to the host. The host makes a request to access a tape volume. The virtual tape server intercepts the tape requests and accesses the volume in the DASD. If the volume is not in the DASD, then the virtual tape server recalls the volume from the tape drive to the DASD. The virtual tape server can respond to host requests for volumes in tape cartridges from DASD substantially faster than responding to requests for data from a tape drive. Thus, the DASD functions as a tape volume cache for volumes in the tape cartridge library.

Two virtual tape servers can be combined to create a peer-to-peer virtual tape server. In a peer-to-peer virtual tape server, two virtual tape servers, each integrated with a separate tape library, can provide access and storage for the same data volumes (i.e. peer-to-peer environment). By providing two virtual tape server subsystems and two libraries, if an operation to recall a file from one virtual tape server subsystem and tape library fails, then the file may still be recalled from the other virtual tape server subsystem and tape library. This redundant architecture provides greater data and tape availability and improved data shadowing in the event a tape or VTS in one subsystem is damaged. Therefore, when a host system writes to the storage device, the data will be saved on both virtual tape servers. However, rather than writing to both virtual tape servers simultaneously, which would be a drain on system resources, a virtual tape controller connecting the two virtual tape servers will write the logical volume to one of the virtual tape servers when the host closes the logical volume. An example of a virtual tape controller is the IBM AX0 Virtual Tape Controller ("AX0 VTC") which acts as an intelligent switch between the two virtual tape servers and transparently connects the host computers with the virtual tape servers. Then, the logical volume is copied by the virtual tape controller from one virtual tape server to the other virtual tape server.

The synchronization process between the virtual tape servers can occur immediately or be deferred based on user preferences. Often a host user will set the backup process to occur at a later time companies that operate on a cyclical basis. For example, a Wall Street firm may desire higher peak host input/output performance during trading hours (and not have the backup process slow down their computers), and chose to defer the backup process between the two virtual tape servers until the trading day has ended. In addition, the IBM Peer-to Peer Virtual Tape Server would operate in deferred mode if one of the VTS subsystems fail.

In operating a virtual tape server, especially one that has a lot of host write activity, space in the VTS DASD cache needs to be continually made available for newly written volumes. However, when operating in deferred mode, if too much data is stored in the DASD before the copy operation is performed, uncopied data may be deleted before being copied to the other virtual tape server, where the oldest data is erased first regardless of whether the data was copied or not. In such cases, the only copy of the data will exist on a physical tape in the tape library, however, backing up the other virtual tape server from a tape drive causes large delays in the backup process. The penalty for a tape drive recall is slightly over a factor of ten in copy throughput. This factor of ten penalty is so severe on the IBM Peer-to-Peer Virtual Tape Server, that if all the logical volumes were on tape, the copy process could never "catch-up" to the host. Thus, there is a need in the art for improved mechanisms for backing up data from one virtual tape server to another in the deferred mode.

SUMMARY OF THE PREFERRED EMBODIMENTS

Provided is a method, system, and an article of manufacture for maintaining data in two storage devices, wherein the data is comprised of a plurality of data sets. A flag is maintained for each data set indicating whether the data set has been copied to the other storage device. In addition, a timestamp is maintained for each data set. Each time a data set is modified or newly created, the data set is flagged as an uncopied data set using the flag associated with the data set. The preferred embodiments modify the timestamp for each uncopied data set by adding a period of time, and thus give preference because when space is needed in the storage device, the data set with the oldest timestamp will be deleted first.

In further embodiments, once the uncopied data set is copied from one storage device to the other storage device, the flag of the newly copied data set is changed to indicate that the data set has been copied. The timestamp for the newly copied data set is then set back to normal by subtracting the same period of time added on when the data set was flagged as needing to be copied.

In still further embodiments, the step of initializing the copy operation from one storage device to the other storage device comprises placing the flag of each data set into a flatfile, reviewing the flag of each data set from the flatfile and searching the flatfile to locate an uncopied data set.

An advantage to the preferred embodiments is that uncopied data sets will be given preference to be retained in the cache over copied data sets without forcing any conditions that would in themselves cause a storage device to fail because a data set could not be copied from the storage device.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
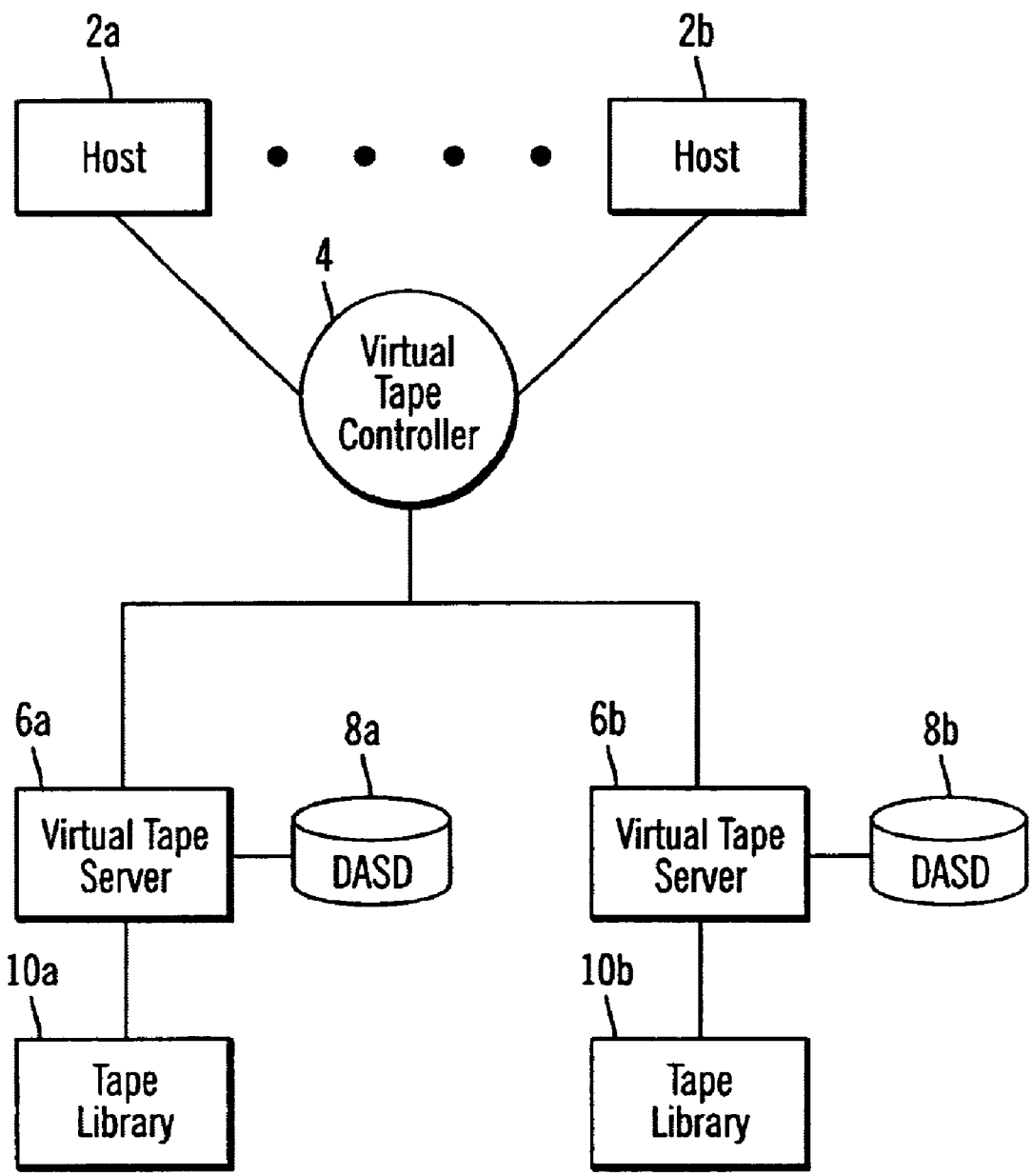
FIG. 1 is a block diagram illustrating a computing environment in which preferred embodiments are implemented.

FIG. 1 illustrates a peer-to-peer computing environment utilizing two virtual tape servers. Additional virtual tape servers can be used by a system, but for purposes of illustration, a single peer-to-peer arrangement is shown. A plurality of host computers 2a, b (two host computers 2a, b are shown for illustration purposes) connect to a virtual tape controller 4 ("VTC"). The host computers 2a, b may connect to the VTC 4 through a channel, such as the Enterprise System Connection (ESCON)** channel. In the peer-to-peer environment, the virtual tape controller 4 is transparent to the host computers 2a, b (i.e. the host system acts as if the host computers 2a, b are writing to a single virtual tape server). The virtual tape controller 4 then routes I/O requests from the hosts 2a, b to one of the virtual tape servers 6a or 6b. The virtual tape servers 6a and 6b control access to direct access storage devices (DASD) 8a and 8b and tape libraries 10a and 10b, respectively.

**AIX, ESCON, Magstar, and RS/6000 are registered trademarks of IBM.

Each DASD 8a, b comprises numerous interconnected hard disk drives. Each tape library 10a, b comprises numerous tape cartridges which may be mechanically loaded into tape drives that the virtual tape servers 6a, b may access. The hosts may include an operating system such as the IBM OS/390 operating system, or any other operating system known in the art. The virtual tape servers 6a or 6b may comprise a server system including software to emulate a tape library, such as the IBM Magstar Virtual Tape Server. For instance, the virtual tape servers 6a, b and the virtual tape controller 4 may be implemented in separate computers comprising an IBM RS/6000 processor, the IBM AIX operating system, and the IBM ADSTAR Distributed Management (ADSM) software or Tivoli Storage Manager, to perform the data movement operations among the hosts 2a, b, DASDs 8a, b, and tape libraries 10a, b.** The tape library may comprise an IBM Magstar Tape Library, such as the Magstar 3494 Tape Library, or any other tape library system known in the art.

**AIX, ESCON, Magstar, and RS/6000 are registered trademarks of IBM.

The DASDs 8a, b provide a tape volume cache, which extends the performance benefits of disk cache to access the volumes in the tape libraries 10a, b and improves performance by allowing host I/O requests to the tape libraries 10a, b to be serviced from the DASDs 8a, b. The virtual tape servers 6a, b appear to the hosts 2a, b as tape drives including tape data volumes. The hosts 2a, b view the virtual tape volumes as actual tape volumes and issue tape management commands, such as mount, and otherwise address the virtual tape servers 6a, b as a tape control unit. Further details of the virtual tape server technology in which preferred embodiments are implemented are described in the IBM publication "Enhanced IBM Magstar Virtual Tape Server: Implementation Guide." IBM document no. SG24-2229-02 (Copyright IBM, April, 1999), which publication is incorporated herein by reference in its entirety.

Volumes maintained in tape cartridges in the tape library 10a, b are logical volumes. A copy of the logical volume can also reside in the DASD 8a, b associated with the virtual tape servers 6a, b. A host 2a, b accesses the data on a logical volume from the resident copy on the DASD 8a, b. If the DASD 8a, b resident copy is updated by a host 2a, b, the logical volume is scheduled to be copied from the DASD 8a, b to the tape library 10a, b when the volume is closed by the host 2a, b. Further, after the DASDs 8a, b space usage reaches a threshold amount, the virtual tape server 6a, b removes logical volumes that have been copied to the tape library 10a, b from the DASD 8a, b to make room for other logical volumes. Once a logical volume has been removed from the DASD 8a, b, it is no longer accessible by a host. If a host 2a, b requests a volume that only resides in tape, then the volume must be recalled and copied from a tape in the tape library 10a, b to the DASDs 8a, b. Recall operations can take several minutes and may include mechanical operations concerning the use of a robotic arm to access tape cartridges from the storage cells and insert into a tape drive, mounting the tape cartridge, rewinding the tape, etc. In preferred embodiments, the tape libraries 10a, b include the same data volumes, thus shadowing each other. However, each virtual tape server 6a, b behaves independently, and each may cache different volumes in DASD. For instance, the virtual tape servers 6a, b may have different volumes resident in their associated DASDs 8a, b as a result of different schedules or algorithms that determine which volumes to remove.

As long as a logical volume is still resident in the DASDs 8a, b, it can be accessed again by a host regardless of whether it has been copied to the tape library 10a, b or not. By allowing a volume to be mounted and accessed from DASDs 8a, b, delay times associated with rewinding the tape, robotic arm movement, and load time for the mounts are avoided because the operations are performed with respect to hard disk drives that do not have the delay times associated with tape access mechanisms. Performing a virtual mount of a logical volume resident in DASD 8a, b is referred to as a cache hit.

Figure 2:
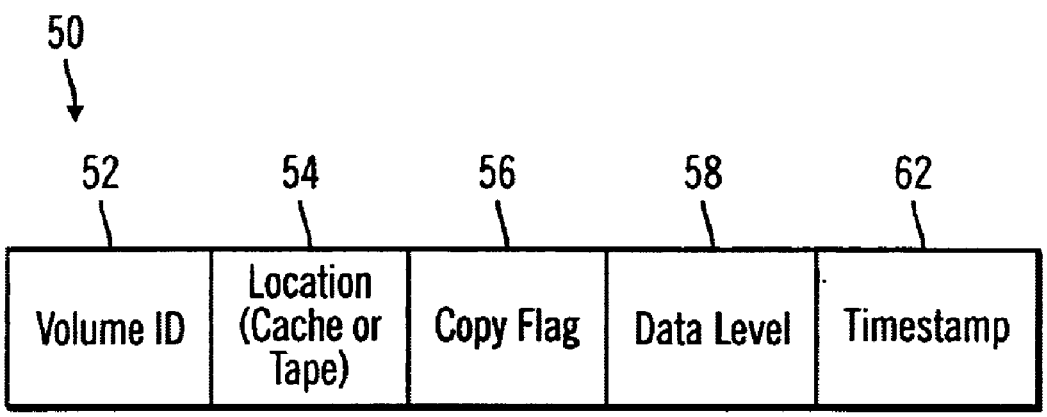
FIG. 2 illustrates a token database record used to access data in accordance with preferred embodiments of the present invention.

Each virtual tape server 6a, b includes a database of tokens or records for every logical volume in the tape library 10a, b to manage the volumes in the virtual tape servers 6a, b. FIG. 2 illustrates the fields or data maintained in each volume token 50. The volume ID 52 indicates the identity of the volume. A location field 54 indicates whether the volume is in the DASD 8a, b of the virtual tape server 6a, b or only in the tape library 10a, b. The location field 54 would indicate that a volume is in the DASD 8a, b even if it is scheduled for destage. A copy flag 56 indicates whether the data has been copied to the other virtual tape server in the peer-to-peer environment. The copy flag 56 is set "on" for a logical volume in one virtual tape server 6a if the other virtual tape server 6b needs to copy the logical volume to its DASD 8b. After a logical volume has been copied from one virtual tape server 6a, the copy flag 56 is set "off" again. A data level 58 indicates the number of times the file has been updated. Every time data is updated to a logical volume, the level field 58 is incremented indicating the number of times a volume in a particular DASD 8a, b has been updated. The logical volume in the DASDs 8a, b having the highest data level includes the most recent version of the update. For this reason, the virtual tape server 6a, b including the most recent version of the data, i.e., having the highest level, will be selected when performing I/O operations with respect to the volume. A timestamp 62 records the last time the logical volume was accessed by the host computers 2a, b.

Figure 3:
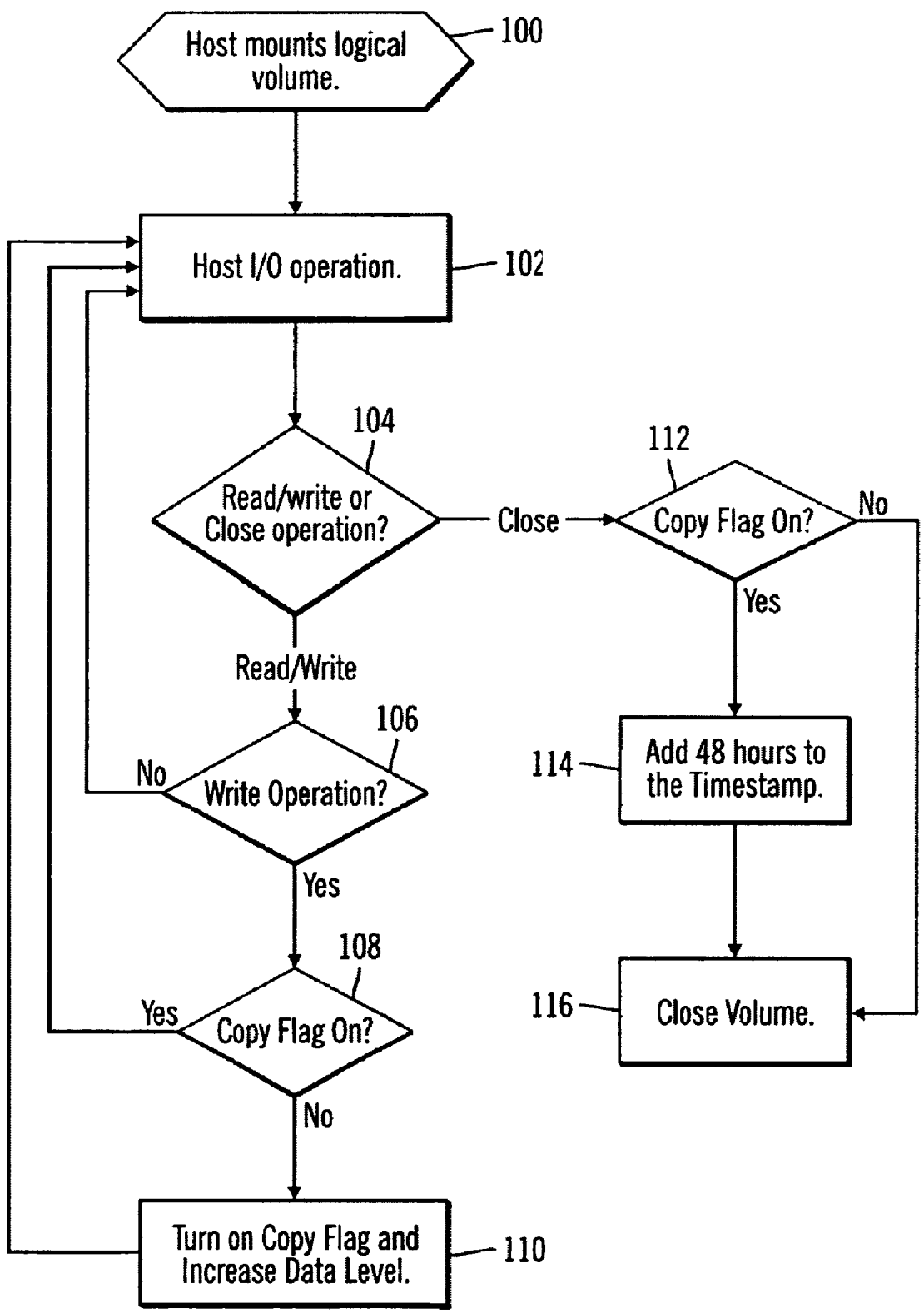
FIG. 3 illustrates logic to preferentially cache uncopied volumes in the DASD cache in accordance with preferred embodiments of the present invention.

FIG. 3 illustrates logic implemented in the controller 4 and the virtual tape servers 6a, b to preferentially cache uncopied logical volumes in the DASD 8a, b according to the preferred embodiments. Typically, each virtual tape server 6a or b tracks the usage of logical volumes by the host 2a or b. Whenever a logical volume is first modified after being mounted by the host computer 2a, b, the virtual tape server 6a, b updates the data level 58. Whenever a logical volume is closed by the host computer, the virtual tape server 6a or b adds it to its cache list. The virtual tape server 6a or b uses this cache list to manage the volumes in its DASD cache 8a or b (i.e. determine whether the volume should be destaged). The virtual tape server 6a or b determines which volumes are kept in the cache the longest using a cache management algorithm such as Least Recently Used ("LRU"). This algorithm is based upon the timestamp 62 of the last access of the logical volume. Volumes with the oldest timestamps are deleted from the DASD cache 8a or b first whenever space is needed in the virtual tape server 6a or b. This ensures that least recently used volumes are deleted from DASD cache 8a or b, before the more recently accessed volumes. Since most data retrievals occur within 24 hours of when that volume was created, the LRU algorithm is generally effective in "immediate" mode, but can still cause unwanted delays in the "deferred mode" as explained above.

Control begins at block 100, when a host computer 2a or b causes a logical volume to be mounted by the virtual tape server 6a, b. The host issues an I/O operation to the virtual tape controller 4 at block 102. At block 104, the virtual tape controller 4 determines whether the I/O operation is a read, write or volume close operation. If it is a read or write operation, the virtual tape controller 4, at block 106, further determines whether the operation is a write operation. If the operation is simply a read operation, the virtual tape controller 4 continues to monitor the host's I/O activities. If the operation is a write operation, the virtual tape controller 4, at block 108 determines whether the copy flag 56 is "on" in the volume's token 50. If the copy flag 56 is "not on," the virtual tape controller 4 turns the flag "on" and also increments the data level 58. The virtual tape controller 4 then waits for the next host I/O operation. By verifying that a copy flag is turned on after every write operation, the virtual tape controller 4 ensures that a newly written volume is marked for copying. If, at block 104, the I/O operation was a volume close, the virtual tape server 6a or b, at block 112, determines if the copy flag is "on." If the copy flag is "on," the virtual tape server 6a or b, at block 114, modifies the timestamp associated with the logical volume by adding forty-eight (48) hours to the timestamp used by the LRU calculation (i.e. timestamp 62 in the token and/or the timestamp in the virtual tape server's file system). This operation makes the uncopied volume appear "newer" than all the other volumes in the DASD cache 8a, b. At block 116, the volume is closed in the virtual tape server 6a or b. Because the timestamp of the volume makes it appear newer, it is preferentially cached by the LRU algorithm in deleting volumes from the DASD cache 8a, b. In alternative embodiments, modification to the timestamp can be performed by other means such as special queues or the time increment used can be different than 48 hours.

Figure 4:
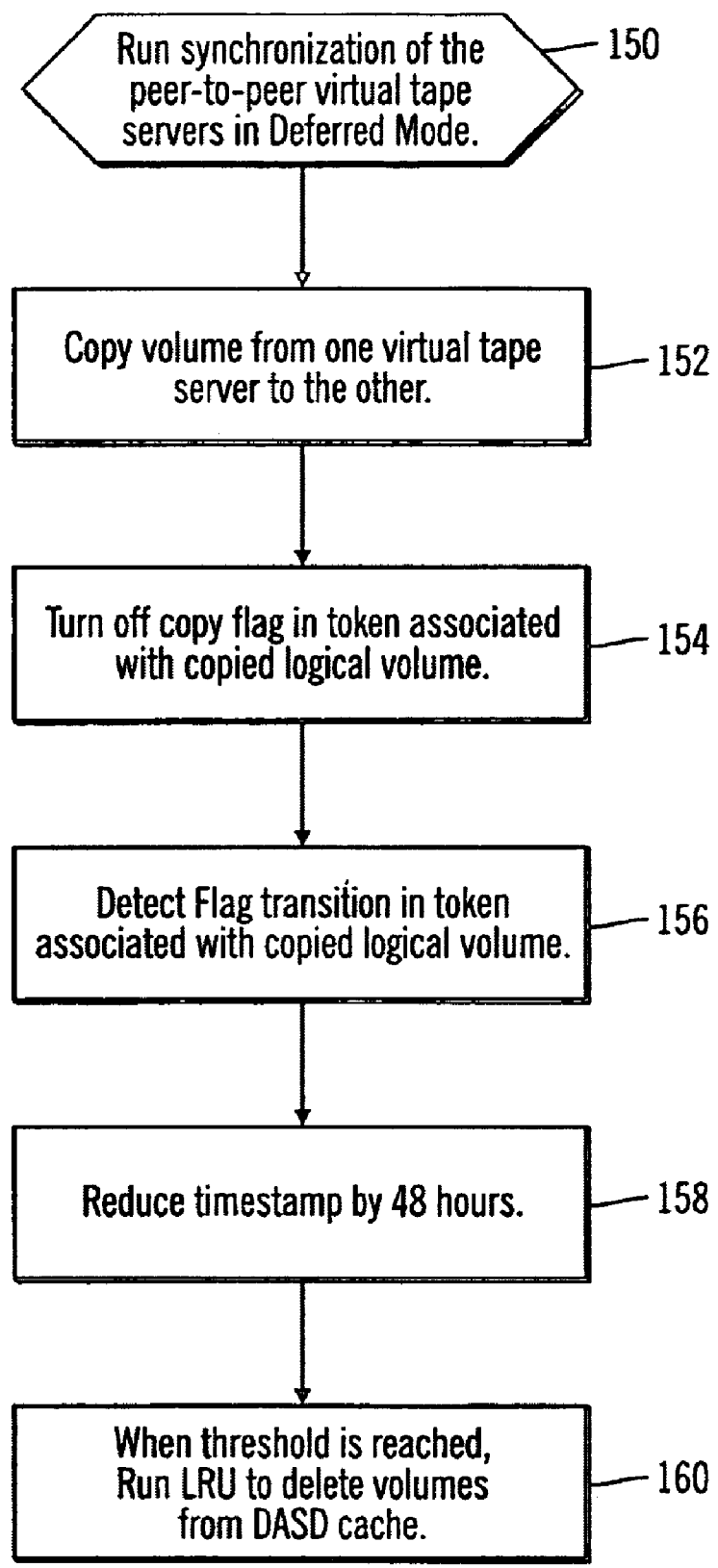
FIG. 4 illustrates logic to copy a volume from one virtual tape server to the other in a peer-to-peer environment in accordance with preferred embodiments of the present invention.

FIG. 4 illustrates logic implemented in the controller 4 to copy a volume from one virtual tape server to the other in a peer-to-peer environment. Control begins at block 150 when the synchronization operation between the peer-to-peer virtual tape servers 6a, b are performed in deferred mode. At block 152, virtual tape controller 4 seeks an uncopied volume (i.e. a volume where the copy flag 56 is "on") from one of the virtual tape servers 6a or b and copies the volume to the other virtual tape server 6a or b. At block 154, the virtual tape controller 4 turns the copy flag 56 in the token 50 to "off" indicating the volume does not need to be copied anymore. At block 156, the server 6a, b detects the copy flag 56 transition from on to off and reduces (at block 158) the timestamp used by the cache LRU calculation for the logical volume by 48 hours. Thus, after the volume is copied, the server 6a, b restores the volume's order in the cache to "normal" (i.e. the order the volume would have had if the volume had not required copying.) When the space usage in the DASD cache 8a, b reaches a threshold, the LRU algorithm (at block 160) can then delete the volume according the order of least recently used once the volume has been copied. Therefore, using a modified timestamp gives preferences to the uncopied volumes without forcing any conditions that would in themselves cause a virtual tape server 6a, b to fail if the virtual tape controller 4 fails to copy the volumes such as a fixed list of "to be copied logical volumes" might.

Figure 5:
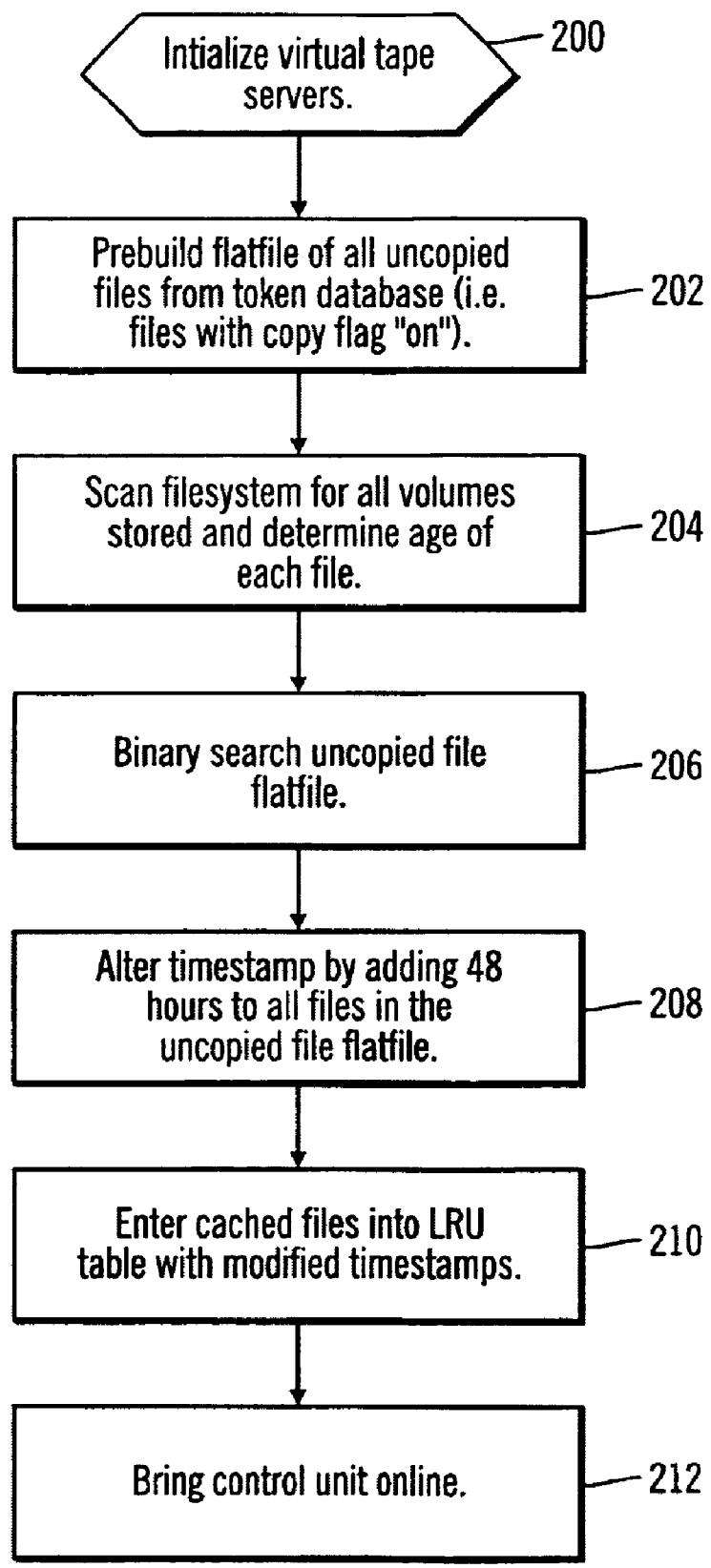
FIG. 5 illustrates logic in the special microcode to initialize the virtual tape servers in accordance with preferred embodiments of the present invention.

FIG. 5 illustrates the logic implemented in the special microcode to initialize virtual tape servers 6a, b of the preferred embodiment. Control begins at block 200 when the virtual tape server 6a or b initializes. At block 202, the virtual tape server 6a, b builds a "flatfile" of all uncopied files in the DASD cache 8a, b by searching the token database and finding the files with the copy flag 56 "on." At block 204, the server 6a, b scans the filesystem and determines the age of each file by looking at the timestamp associated with each file. At block 206, a binary search of the flatfile determines the list of volumes that require copying. Thus, the interrogation of the copy flags 56 becomes a binary search of the flatfile and operates in an order of magnitude faster than interrogating the volumes one by one. If the copy flag 56 is "on," at block 208, the timestamp of the uncopied volume is altered as described above for a host written uncopied logical volume (i.e. the server 6a, b modifies the timestamp 62 associated with the logical volume by adding forty-eight (48) hours to the timestamp used by the LRU calculation.) At block 210, the virtual tape servers 6a, b enters the cached files into a LRU table including the files with modified timestamps. At block 212, the control unit is brought online.

Additional Implementation Details

This concludes the description of the preferred embodiments of the invention. The following describes some alternative embodiments for accomplishing the present invention. The technique for preferentially keeping uncopied files in the virtual tape servers described herein may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks,, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments of the configuration discovery tool are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

Preferred embodiments were described with respect to the IBM virtual tape server system. However, the preferred logic could apply to any virtual storage system in which a faster storage system, including either magnetic storage or memories, is used to cache data from a slower storage system. For instance, the cache may comprise memory devices and the storage devices may comprise sets of hard disk drives whose data sets are paged into the corresponding memory sets to provide access to the data sets through the faster access cache. Moreover, although the preferred embodiments were described with respect to a peer-to-peer environment, the preferred logic could apply to other environments such as a client-server environment where copies of the same data is kept at both locations. In addition, the preferred logic could apply to a situation where a copy of the logical volume can be kept in multiple storage devices. For example, the logic can apply in a peer-to-peer-to-peer environment with three separate virtual tape servers where the same logical volume is copied to each virtual tape server.

Preferred embodiments were described with respect to recalling, mounting, and maintaining tokens for data volumes. However, any data set or unit of data storage such as files, tracks, fixed blocks, etc., could be the subject of the recalling and mounting operations. The term "data set" as used herein refers to any unit of data storage.

In preferred embodiments, virtual tape controllers were used to select a virtual tape server to handle the recall or I/O access operation. In alternative embodiments, the hosts may make such a selection, or the virtual tape servers may determine which virtual tape server to use to handle the recall or access operation.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for maintaining data in two storage devices, wherein the data is comprised of a plurality of data sets, comprising:

maintaining in a first storage device a flag for each data set indicating whether the data set has been copied to a second storage device;

maintaining a timestamp for each data set, wherein the timestamp initially represents a last time the data set was accessed;

flagging each data set as an uncopied data set when the data set is modified or newly created;

modifying the timestamp for each uncopied data set by adding a period of time to the last time the data set was accessed; and removing data from the first storage device based on the timestamp of each data set.

2. The method of claim 1, further comprising:

copying the uncopied data set from the first storage device to the second storage device;

changing the flag of the uncopied data set to indicate that the data set has been copied; and modifying the timestamp for the uncopied data set by subtracting the period of time.

3. The method of claim 2, wherein copying the uncopied data set is performed during a process of synchronizing data on both the first and second storage devices.

4. The method of claim 1, wherein the first and second storage devices are in a peer-to-peer environment.

5. The method of claim 1, further comprising:

placing the flag of each data set into a flatfile;

reviewing the flag of each data set from the flatfile; and searching the flatfile to locate the uncopied data set.

6. The method of claim 1, wherein the step of removing data from the first storage device based on the timestamp of each data set comprises using a Least Recently Used algorithm.

7. The method of claim 1, wherein the flag and the timestamp are maintained in a token associated with each data set.

8. The method of claim 1, wherein the flag and the timestamp associated with each data set are maintained in a file system of the first and second storage devices.

9. The method of claim 1, wherein the first and second storage devices comprise a DASD cache.

10. The method of claim 9, wherein the first and second storage devices function as a high speed cache for a third and a fourth storage library respectively.

11. A system for maintaining data in two storage devices, wherein the data is comprised of a plurality of data sets, comprising:

means for maintaining in a first storage device a flag for each data set indicating whether the data set has been copied to a second storage device;

means for maintaining a timestamp for each data set, wherein the timestamp initially represents a last time the data set was accessed;

means for flagging each data set as an uncopied data set when the data set is modified or newly created;

means for modifying the timestamp for each uncopied data set by adding a period of time to the last time the data set was accessed; and means for removing data from the first storage device based on the timestamp of each data set.

12. The system of claim 11, further comprising:

means for copying the uncopied data set from the first storage device to the second storage device;

means for changing the flag of the uncopied data set to indicate that the data set has been copied; and means for modifying the timestamp for the uncopied data set by subtracting the period of time.

13. The system of claim 12, wherein copying the uncopied data set is performed during a process of synchronizing data on both the first and second storage devices.

14. The system of claim 11, wherein the first and second storage devices are in a peer-to-peer environment.

15. The system of claim 11, further comprising:

means for placing the flag of each data set into a flat file;

means for reviewing the flag of each data set from the flat file; and means for searching the flatfile to locate the uncopied data set.

16. The system of claim 11, wherein the step of removing data from the first storage device based on the timestamp of each data set comprises using a Least Recently Used algorithm.

17. The system of claim 11, wherein the flag and the timestamp are maintained in a token associated with each data set.

18. The system of claim 11, wherein the flag and the timestamp associated with each data set are maintained in a file system of the first and second storage devices.

19. The system of claim 11, wherein the first and second storage devices comprise a DASD cache.

20. The system of claim 19, wherein the first and second storage devices function as a high speed cache for a third and a fourth storage library respectively.

21. The system of claim 11, wherein the first and second storage devices are two storage devices located in an environment with multiple interlinked storage devices maintaining the same data sets.

22. An article of manufacture containing code for maintaining data in two storage devices, wherein the data is comprised of a plurality of data sets, comprising a computer usable media including at least one computer program embedded therein that is capable of causing at least one computer to perform operations comprising:

maintaining in a first storage device a flag for each data set indicating whether the data set has been copied to a second storage device;

maintaining a timestamp for each data set, wherein the timestamp initially represents a last time the data set was accessed;

flagging each data set as an uncopied data set when the data set is modified or newly created;

modifying the timestamp for each uncopied data set by adding a period of time to the last time the data set was accessed; and removing data from the first storage device based on the timestamp of each data set.

23. The article of manufacture of claim 22, further performing:

copying the uncopied data set from the first storage device to the second storage device;

changing the flag of the uncopied data set to indicate that the data set has been copied; and modifying the timestamp for the uncopied data set by subtracting the period of time.

24. The article of manufacture of claim 23, wherein copying the uncopied data set is performed during a process of synchronizing data on both the first and second storage devices.

25. The article of manufacture of claim 22, wherein the first and second storage devices are in a peer-to-peer environment.

26. The article of manufacture of claim 22, further performing:

placing the flag of each data set into a flat file;

reviewing the flag of each data set from the flat file; and searching the flatfile to locate the uncopied data set.

27. The article of manufacture of claim 22, wherein the step of removing data from the first storage device based on the timestamp of each data set comprises using a Least Recently Used algorithm.

28. The article of manufacture of claim 22, wherein the flag and the timestamp are maintained in a token associated with each data set.

29. The article of manufacture of claim 22, wherein the flag and the timestamp associated with each data set are maintained in a file system of the first and second storage devices.

30. The article of manufacture of claim 22, wherein the first and second storage devices comprise a DASD cache.

31. The article of manufacture of claim 30, wherein the first and second storage devices function as a high speed cache for a third and a fourth storage library respectively.

* * * * *

UNITED STATES PATENT AND TRADEMARK OFFICE
CERTIFICATE OF CORRECTION

PATENT NO.   : 6,745,212 B2
DATED        : June 1, 2004
INVENTOR(S)  : Kishi et al.

It is certified that error appears in the above-identified patent and that said Letters Patent is hereby corrected as shown below:

<u>Title page, Item [54] and Column 1, line 2,</u>
Title, delete "AN IBM" and insert -- A --.

Signed and Sealed this

Twenty-seventh Day of December, 2005

JON W. DUDAS
*Director of the United States Patent and Trademark Office*